June 16, 1942.  W. WORTH  2,286,452
FLUID MOTION TRANSMITTING DEVICE WITH SYNCHRONIZER
Filed April 12, 1940  2 Sheets-Sheet 1
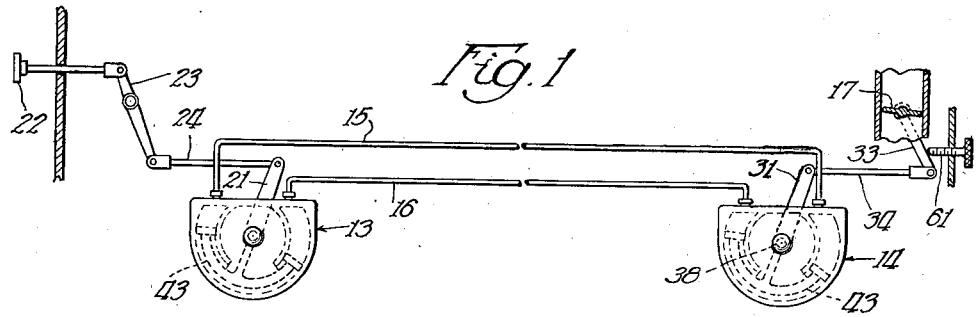
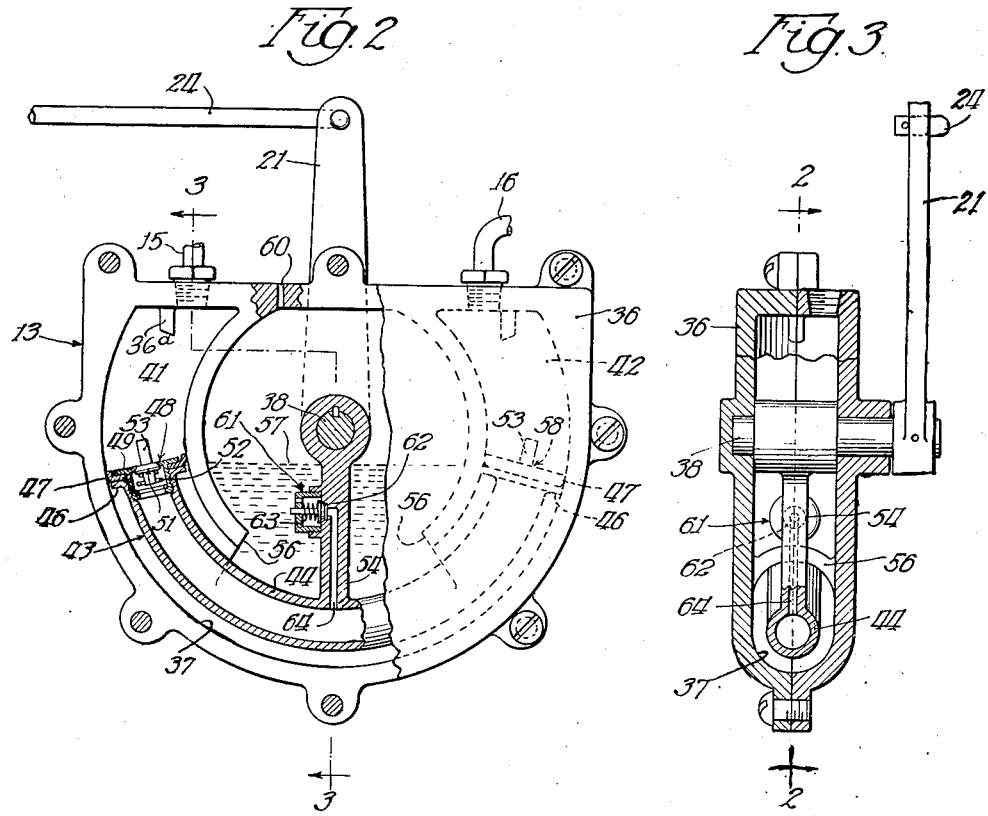
Inventor
Weldon Worth
By: Edward C. Fitzbaugh
Atty

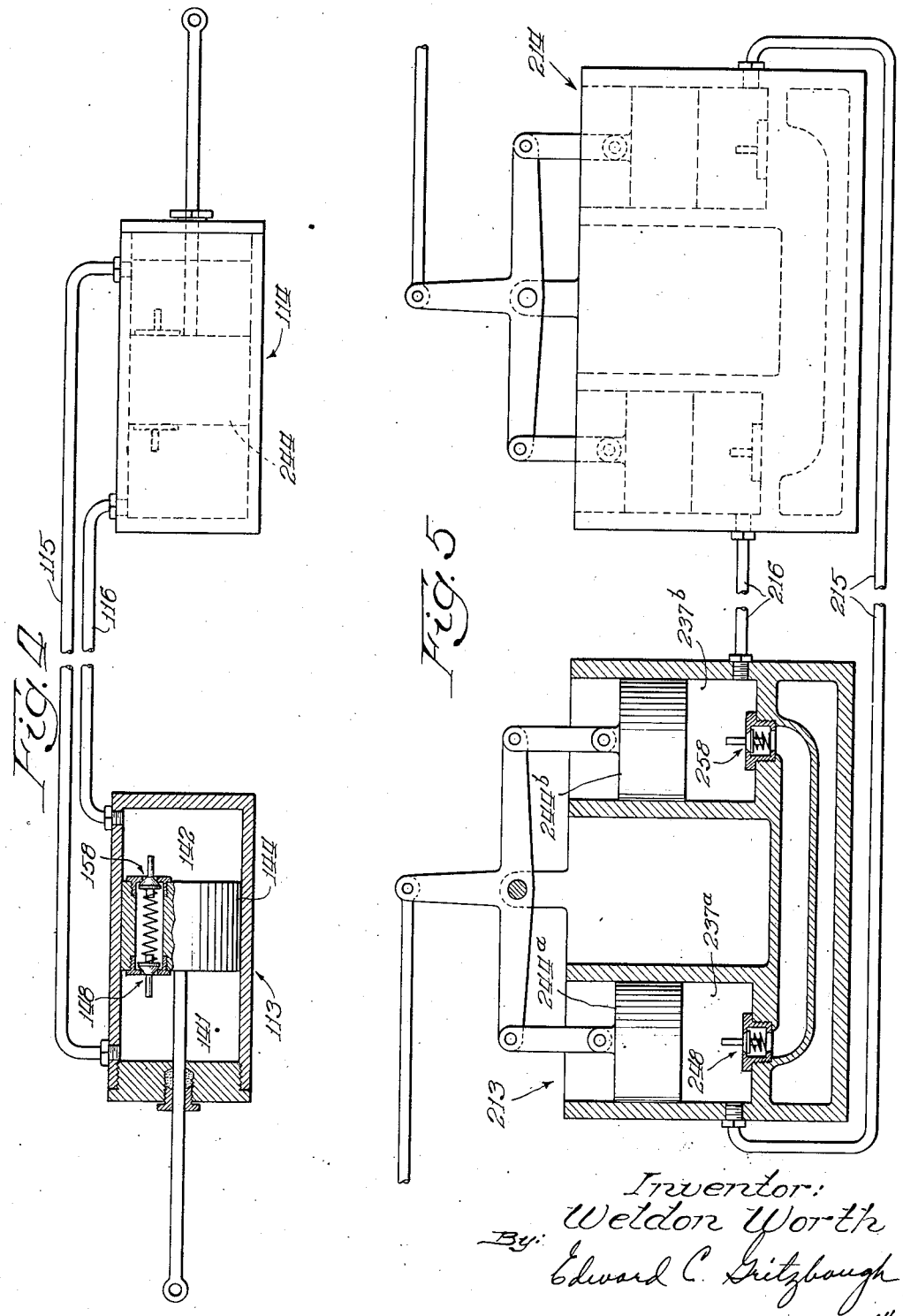

Patented June 16, 1942

2,286,452

UNITED STATES PATENT OFFICE 2,286,452

FLUID MOTION TRANSMITTING DEVICE WITH SYNCHRONIZER

Weldon Worth, Dayton, Ohio

Application April 12, 1940, Serial No. 329,246

14 Claims. (Cl. 60—54.5)

This invention relates to hydraulic control linkages or pulsators.

It has been proposed before my invention to employ a fluid link as a pulsator or motion transmitting medium as exemplified for example in the patent to Pagendarm 976,907.

It is an object of this invention to provide an improved mechanism for effecting the pulsations of fluid links, which improved mechanism can be more economically manufactured, and which is more efficient in its operation.

More specifically it is an object to provide an improved arrangement for effecting synchronization of the driving and driven elements of hydraulic pulsators.

It is a still more specific object to provide an improved construction of driving and driven mechanisms arranged with particular reference to the transmission of torque from both the driving and driven mechanism to the respective input and output shafts thereof with the minimum amount of mechanical linkage and accompanying lost motion.

Other and more particular objects, advantages and uses of my invention will become apparent from a reading of the following specification taken in connection with the accompanying drawings which form a part thereof and wherein:

Fig. 1 is a schematic elevation view showing a preferred embodiment of my invention;

Fig. 2 is an elevation taken substantially on line 2—2 of Fig. 3, with the forward half of the casing partially broken away;

Fig. 3 is a section view substantially on line 3—3 of Fig. 2;

Fig. 4 is a schematic view of a second embodiment of my invention; and

Fig. 5 is a schematic view of a third embodiment of my invention.

Referring in greater detail to Figs. 1 to 3 of the drawings, one preferred embodiment of my hydraulic control comprises two units, a driving unit referred to generally at 13, and a driven unit 14, which units are connected by liquid transmitting conduits 15 and 16. The purpose of the hydraulic control is to provide manual control of some remotely located device such as a throttle or choke valve 17, the manually operated element such as button 22 being for example located in the cabin compartment of an aeroplane (not shown). The movement of the lever arm 21 on the driver unit 13 by means of manual button 22 and links 23 and 24 produces a corresponding movement of the lever arm 31 on the driven unit 14 which, by this operation, effects the remote control of valve 17 through links 33 and 34. This transfer of motion from one unit to the other, is accomplished by the movement of liquid through the connecting lines 15 and 16.

The internal construction of the driven unit 14 and the driver unit 13 are identical in all respects. These units each comprise a housing indicated generally at 36, including an arcuate cylinder 37. This cylinder is circular in cross-section and arcuate in shape, the axis thereof being only a segment of a complete circle whose center lies on the axis of driving shaft 38. The chambers 41 and 42 formed by the cylinder 37, the opposite ends of a double piston assembly indicated generally at 43, and the closed ends of the cylinder 37, control the flow of oil through the links 15 and 16, for operating the remotely located driven unit 14. The double piston assembly 43 comprises a rigid arcuate hollow tubular member 44 of somewhat smaller cross-sectional area than chambers 41 and 42. The opposite terminal portions of tubular member 44 extend into opposed portions of segmental cylinder 37 to partially define adjustable size chambers 41 and 42. These opposite terminal portions are defined by a piston like flange 46 having a free fit within the wall of cylinder 37. A flexible one way seal 47 is held in place by a valve cage member indicated generally at 48, threaded into the end of piston 43. Cage 48 is generally tubular in cross-section, with a threaded outer periphery, and an external seal engaging flange 49. Centrally of flange 49 cage 48 is orificed to provide on the underside a seat for check valve 51, urged into engagement with its seat by a light spring 52. Valve 51 is additionally provided with a forward stem 53 having the function of engaging a protuberance 36a adjacent the end of cylinder 37 when the associated end of double piston 43 approaches its limit of movement, for a purpose to be later pointed out. The opposite terminal of piston assembly 43 is constructed in an identical manner, and includes a second identical valve indicated generally at 58. It will be apparent that protuberances 36a may be eliminated and the length of valve stems 53 varied to suit conditions of particular installations by merely limiting the overall arcuate length of cylinder 37.

Piston assembly 43 is drivingly connected with shaft 38 through link 54, which passes through an interrupted portion 56 of cylinder 37. Liquid is maintained in housing 36 at about the level indicated at 57 and communicates through opening 56 with the back sides of the one-way seals 47 on the double piston 43. The rotation of this assembly about the pivot point moves the pistons up and down in their cylinder increasing the volume of chamber 41 exactly as the volume of chamber 42 is decreased. Should any leakage occur in fluid links 15 or 16, then one-way seals 47 will become effective in response to the resulting vacuum to permit replacement fluid from reserve supply 57 to flow thereby. Flow in the reverse direction past one-way seals 47 is prevented by the fact that the periphery of the seal is forced outwardly against the wall of cylinder 37.

A vent 60 is provided in housing 36 for admitting atmospheric pressure above liquid level 57 and one-way piston seals 47 function upon the pressure within either chamber 41 or 42 dropping below atmospheric pressure to allow liquid from the central reservoir to pass thereby and replace any loss that may have previously taken place.

While in most installations this arrangement should suffice to maintain both fluid links full of liquid, in certain other installations an auxiliary reservoir may be located at a higher elevation than the centrally located reservoir, such an alternate arrangement being shown in Pagend- arm Patent 976,907.

An important feature of this modification resides in the arrangement of the piston 43 in the circular form which permits rigid attachment to a connecting link 54 and avoids lost motion usually present in the connecting linkage mechanism normally associated with the present type of hydraulic pulsators.

A further and very important feature of this invention resides in the operation of valves 51 and 58 in controlling the flow of liquid through the tube 44. The purpose of this novel arrangement is to synchronize the lever arm 21 of the driving unit 13 with the arm 31 of the driven unit 14 or in other words return these arms to the same relative position in the event that they lose their proper arcuate relation to each other.

There are two representative applications of a control of this type and two different methods in which the synchronization is made to take place. In the first application, the driven arm 31 of unit 14 is allowed full motion from one extreme to the other and is not limited by the device which is operated thereby. In this case, when the two units have gotten out of synchronization, the piston 46 in the driven unit will for example reach the end of its stroke before the piston in the driver unit. When the piston 46 in the driven unit 14 is moved, for example, in a counterclockwise direction, as shown in Fig. 1, until it reaches the end of its stroke in this manner, the valve 58 thereof will be opened by contact of the stem 53 with the corresponding protuberance 36a. Any attempt to move the driver unit further will apply additional pressure to the fluid in the chamber 41 of the driven unit 14. This additional pressure in chamber 41 of the driven unit upon reaching a value in excess of the strength of spring 52 will open the valve 51 in that chamber and provide free passage through the connecting tube 44 into chamber 42 of the driven unit and thence to chamber 41 of the driver unit 13, since both valves 51 and 58 of the driven unit 14 are then open. This transfer of liquid from one side of the piston of the driver unit to the other side thereof will continue until the piston 46 of the driver unit 13 reaches the end of its stroke and is then in the same relative position as the piston in the driven unit, and synchronization is thus accomplished.

In the second application of the hydraulic control, the driven unit is restricted in its stroke by adjustable stop 61 (Fig. 1) being moved into position to be contacted by link 33 prior to this link reaching its full limit of travel. In such a case, during the operation of the driven unit 14, its piston will not reach the end of the normal stroke and the synchronization referred to above could not take place therein. Any lack of synchronization that may develop will be indicated by the double piston 43 in the driven unit 14, not coming to the end of its stroke for the corresponding end of the stroke in the driving unit 13. Let it be assumed that the piston assembly of unit 14 is not moved far enough in the clockwise direction. Then to synchronize requires more liquid in chamber 41 of the driving unit than now exists and it is necessary to transfer some of the liquid from chamber 42 to chamber 41 of the driving unit 13 to provide the necessary synchronization. When the piston 43 of the driver unit 13 reaches the end of its stroke in the clockwise direction, the valve 51 will be opened by contact with the protuberance 36a. In this position there is only one way in which the unit 13 can be moved and that is in the opposite or counterclockwise direction. Upon the initiation of the movement in this direction, there is a surge of pressure caused by the inertia and friction forces that build up in forward chamber 42 of unit 13. This pressure will cause opening of valve 58 in chamber 42 of unit 13 and accomplish liquid flow through the tube 44 and the valve 51 of that unit which is held open by the protuberance 36a, until the piston moves far enough away from the end wall of the chamber 41 of unit 13 to permit the valve 51 to close. In the controls constructed to date, the length of this stroke during which synchronization takes place is limited to approximately an eighth of an inch by the length of the extension 53 on the valve 51 or the allowable movement of the valve in cage 48. In other words, if the valve 51 is held open the last eighth of an inch of arcuate movement of piston assembly 43, then the movement of the piston in the opposite direction through this eighth of an inch stroke will result in liquid being passed from chamber 42 to chamber 41 of unit 13 and accomplish a partial synchronization. Since this action takes place with every stroke of the control, it is only necessary to have the same take place at a faster rate than any leakage which might throw the control out of synchronization.

These two applications of hydraulic control synchronization are explained only at one end of the stroke but of course exactly the same action may be made to take place at the other end of the stroke.

Under certain conditions the pressure in piston 44 may become excessive and interfere with the operation of valves 51. For example this might result from a considerable increase in temperature when there is no intervening operation of valves 51. To guard against this contingency I have provided a pressure relief valve indicated generally at 61 and comprising a disc valve 62 normally held against its seat by a spring 63 of predetermined strength sufficient to prevent the opening of the relief valve 62 under normal working conditions. I have shown this valve as mounted on piston rod 54 and in communication with piston 44 through passage 64, but it will be apparent that this relief valve can be as readily located directly on piston 44 or elsewhere. It will be equally apparent that other equivalent pressure relief arrangements may be provided.

While I have disclosed above the novel advantages of my valves in the ends of an arcuate double piston and contemplate their use in this relation, I nevertheless consider a straight double piston, such for example as the type shown in Pagendarm 976,907, as coming within my invention when made with a central passage therethrough and equipped with my arrangement of valves in each end thereof. Referring in greater detail to Fig. 4 such an alternative arrangement is illustrated as comprising a driving unit 113 and a driven unit 114 connected by conduits 115 and 116. Double pistons 144 are straight as differentiated from arcuate pistons 44 of Fig. 2. Valves 148 and 150 carried by pistons 144 are in communication through passage 144a and function in the manner described in connection with the modification of Figs. 1 to 3 to synchronize the movements of the pistons.

Turning to a third modification shown in Fig. 5, a driving unit 213 is connected to a driven unit 214 by conduits 215 and 216. Two separate pistons 244a and 244b take the place of the unitary double piston of the preceding modifications. The valves 248 and 250 are located in the ends of the cylinders 237a and 237b, and function in very much the same manner as above described to effect synchronism of the pistons.

It will be understood that sealing means, pressure responsive means and other elements disclosed in connection with Figs. 1 to 3 may be provided in the modifications of Figs. 4 and 5, a showing thereof being omitted for the sake of simplification.

While I have in other respects disclosed my invention in connection with certain specific embodiments thereof, I wish these to be considered by way of example and not by way of limitation, except as defined by the appended claims.

I claim:

1. In a fluid type motion transmitting assembly including a driving unit and a driven unit, each of said units comprising means defining a pair of variable volume chambers, means defining a pair of fluid links reversely connecting the chambers of said respective units, each of said chambers defining means including piston means, the movement of a first piston means in the driving unit being effective to enlarge the volume of one chamber of said unit and reduce the volume of the other chamber thereof and at the same time is effective to cause transmission of fluid through said links to produce a duplication of movement of said piston means in said driven unit, said arrangement being particularly characterized by the additional provision of means defining a conduit connecting together said chambers of the driving unit and means defining a second conduit connecting together the chambers of said driven unit and separate valves controlling each of the terminal portions of said conduits, said valves each being provided with means operable in response to the movement of the piston means to within a predetermined distance of the respective limits of movement thereof for opening said corresponding valve, the valve associated with the other terminal portion of the conduit being operable in response to a predetermined fluid pressure thereagainst for effecting a transfer of liquid through said associated conduit for bringing about synchronization between said piston means.

2. In a fluid type motion transmitting device including a driving unit and a driven unit, each unit comprising means defining two interdependent variable volume fluid chambers formed in part by piston means, a pair of fluid links reversely connecting the variable volume chambers of one unit to the chambers of said other unit for positively relating the expansion stroke of one to the compression stroke of the other unit, means defining a conduit connecting together the variable volume chambers of the driving unit and means defining a conduit connecting together the variable volume chambers of said driven unit, valve means positioned in each of the terminal portions of said conduits for controlling the flow through said conduits, said respective valve means being operable to open position in response to movement of said corresponding piston means to a position adjacent the extreme limit of travel thereof, the valve means in the opposite terminal portion of said conduit from a valve so operated being operable in response to a predetermined increase in pressure thereagainst for effecting flow through said associated conduit, to provide an adjustment of the relative positions of the piston means in said respective driving and driven units.

3. The arrangement defined in claim 2 being further particularly characterized by the provision of pressure responsive means in communication with at least one of said conduits for relieving excessive pressure therein.

4. The arrangement defined in claim 2 being particularly further characterized by the provision of a pressure relief valve in communication with at least one of said conduits and operable in response to a predetermined pressure therein for relieving said pressure.

5. In a fluid type motion transmitting device including a driving unit and a driven unit, each unit comprising means defining two interdependent variable volume fluid chambers, said means including an elongated cylinder, a piston reciprocable in said cylinder, a pair of fluid links reversely connecting the variable volume chambers of one unit to the variable volume chambers of said other unit for positively relating the expansion stroke of one to the compression stroke of the other, the combination therewith of a separate passage formed between the opposed faces of each of said pistons, valve means positioned in each of the terminal portions of said passages for controlling the flow therethrough, said valve means being particularly characterized by the provision of oppositely extending protuberances the leading one of said protuberances operable in response to the movement of its corresponding piston to a position adjacent the extreme limit of travel thereof for opening the leading valve, the trailing valve means located in the opposite terminal portion of said passage being operable in response to a predetermined increase in pressure thereagainst for effecting flow through said passage, to provide an adjustment of the relative positions of the pistons in said respective driving and driven units.

6. The arrangement defined in claim 5, wherein said passages are at least partially formed in said housing.

7. In a pulsator for a fluid type motion transmitting device including a driving unit and a driven unit, a housing including means defining two cylinder chambers, each chamber having an opening which serves alternately as an inlet and an outlet therefor, connected pistons in said chambers, means operating automatically under certain conditions of operation to transfer fluid from one of said chambers to the other of said chambers, said fluid transferring means comprising a conduit adapted to connect said chambers one to the other, normally closed check valves in the respective ends of said conduit each adapted to be opened by fluid pressure in the corresponding chamber, and means controlled by the movement of said piston for opening the valve at the leading end of said piston when the latter approaches within a predetermined distance from the limit of its movement, and means for actuating said piston to cause the valve at one end of said conduit to be opened while the valve at the other end of said conduit is held open by said piston controlled means, thereby permitting fluid to flow through said conduit from one of said chambers to the other of said chambers.

8. A driving unit for a fluid type motion transmitting device including a driving unit and a driven unit, said driving unit comprising two cylinder chambers, connected pistons in said chambers operable to vary the volume of the two chambers in reverse relation, the end portion of each chamber having an opening whereby it may be connected with said driven unit and each opening serving alternately as an inlet to and an outlet from the corresponding chamber, a conduit to connect said chambers, normally closed check valves in the respective ends of said conduit arranged to be opened by fluid pressure in the adjacent chamber, means controlled by each piston for opening the valve in the leading end of said conduit when said piston approaches within a predetermined distance from the limit of its movement in one direction, and mechanical means for actuating said pistons to cause the valve at one end of said conduit to be opened by said cooperating parts and to create said pressure on the valve at the other end of said conduit, thereby opening the last mentioned valve and permitting fluid to flow from one of said chambers to the other chamber.

9. A driving unit for a fluid type motion transmitting device including a driving unit and a driven unit, said driving unit comprising two cylinder chambers, connected pistons in said chambers operable to vary the volume of the two chambers in reverse relation, the end portion of each chamber having an opening whereby it may be connected with said driven unit and each opening serving alternately as an inlet to and an outlet from the corresponding chamber, a conduit to connect said chambers, normally closed check valves in the respective ends of said conduit arranged to be opened by fluid pressure in the adjacent chamber, means controlled by each piston for opening the valve in the leading end of said conduit when said piston approaches within a predetermined distance from the limit of its movement in one direction, and mechanical means for actuating said pistons to cause the valve at one end of said conduit to be opened and to create said pressure on the valve at the other end of said conduit, thereby opening the last mentioned valve and permitting fluid to flow from one of said chambers to the other chamber, and a relief conduit leading from the first mentioned conduit and a relief valve in said relief conduit.

10. In a fluid type motion transmitting device including a driving unit and a driven unit, each unit comprising two cylinder chambers, fluid lines reversely connecting the chambers of the two units, connected pistons mounted in the chambers of each unit and having sealed engagement therewith, a conduit connecting the chambers of each unit one with the other, check valves in the respective ends of said conduit and arranged to be opened by fluid pressure in the respective chambers, means controlled by each piston for opening the valve in the leading end of said conduit when said piston approaches within a predetermined distance from the limit of its movement, and a device for actuating the pistons of said driving unit.

11. A fluid type motion transmitting device including a driving unit and a driven unit, each unit comprising a pair of cylinder chambers, fluid lines reversely connecting the chambers of the two units, a double piston mounted in each pair of chambers and having sealed engagement therewith, each piston having a passageway therethrough adapted to connect one of said chambers with the other chamber, check valves in the respective ends of said passageway arranged to be opened by fluid pressure in the respective chambers, each valve having a part cooperating with a part of the corresponding chamber to open said valve as said piston approaches within a predetermined distance from the limit of its movement, and a device for actuating the piston of said driving unit.

12. In a fluid type motion transmitting device including a driving unit and a driven unit, said driving unit comprising two variable volume chambers with associated piston members for effecting said variations in volume, said piston members being connected to increase the volume in one chamber as the volume in the other chamber is decreased, means for moving said piston members to actuate said driven unit, and valve means within said driving unit controlled by the movement and position of said piston members to transfer fluid from one of said variable volume chambers directly to the other of said chambers when said piston members are near the limit of their movement in one direction to effect synchronization between said driving unit and said driven unit.

13. In a fluid pulsator mechanism for causing a duplication of the arcuate movements of two remotely located shafts and including a fluid responsive assembly connected with each shaft, each of said assemblies comprising a housing formed with two arcuate cylinders having spaced open ends facing each other, said cylinders being arranged in the arcs of a circle described about the corresponding shaft, and an arcuate double piston having its opposite ends sealably received in the respective cylinders, fluid lines reversely connecting the cylinders of one housing with the cylinders of the other housing, arms extending from the mid portions of the respective double pistons and drivingly connected to the corresponding shafts, the arcuate piston of each of said assemblies having a passage therethrough adapted to connect the cylinders of that assembly one with the other, normally closed check valves at the respective ends of said passage arranged to be opened by fluid pressure in the respective cylinders, each valve having a part arranged to engage a part of the corresponding cylinder and open said valve as said piston approaches within a predetermined distance from the limit of its movement toward the outer end of said cylinder.

14. In a device for causing a driven shaft to duplicate the arcuate movements of a remotely located driving shaft, each of said shafts being provided with a housing formed with a pair of arcuate cylinders having spaced open ends and arranged in arcs of the same circle described about the axis of said shaft, a double piston in each pair of cylinders comprising an arcuate member having a piston at each end thereof, said pistons having sealed engagement with the respective cylinders, a connecting rod secured to each arcuate member intermediate the ends thereof and to the associated shaft, a pair of fluid lines reversely connecting the cylinders of one of said housings with the cylinders of the other housing whereby the arcuate movement of said driving shaft causes the leading one of the pistons associated therewith to force fluid into engagement with the trailing one of the pistons associated with the driven shaft to cause said driven shaft to move in the same direction and in arcuate synchronization with said driving shaft, the arcuate member connected with said driving shaft having a longitudinal passage therethrough, check valves at the respective ends of said passage to prevent the flow of fluid therethrough and arranged to be opened by fluid pressure in the respective cylinders, means controlled by the movement of said arcuate member to open the valve in the leading piston thereof when said piston approaches within a predetermined distance of the limit of its movement in one direction, and means for actuating said driving shaft and for causing both check valves to be opened when the two shafts are out of synchronization and thus permit fluid to flow from one cylinder to the other cylinder and thereby restore synchronization.

WELDON WORTH.